(12) United States Patent
Liu et al.

(10) Patent No.: US 6,769,150 B1
(45) Date of Patent: Aug. 3, 2004

(54) METHOD AND DEVICE FOR CLEANING OPTICAL CONNECTORS

(75) Inventors: Kechuan Liu, Plano, TX (US); Shawn Legas, Plano, TX (US)

(73) Assignee: Alcatel, Societe Anonyme, Paris (FR)

( * ) Notice: Subject to any disclaimer, the term of this patent is extended or adjusted under 35 U.S.C. 154(b) by 226 days.

(21) Appl. No.: 10/053,469

(22) Filed: Nov. 7, 2001

(51) Int. Cl.[7] .............................. A46B 13/00; B08B 9/20
(52) U.S. Cl. .............................. 15/21.1; 15/97.1; 15/56; 385/147
(58) Field of Search ................................ 15/97.1, 21.1, 15/56, 59, 101, 23, 28, 22.1, 22.2; 385/53, 147

(56) References Cited

U.S. PATENT DOCUMENTS

| | | | | |
|---|---|---|---|---|
| 3,030,967 A | * | 4/1962 | Peyron ........................ 132/333 |
| 4,204,294 A | * | 5/1980 | Halverson .................... 15/185 |
| 4,850,071 A | * | 7/1989 | Lawrence .............. 15/104.095 |
| 5,117,528 A | | 6/1992 | Kanayama et al. ........... 15/210 |
| 5,220,703 A | | 6/1993 | Kanayama et al. ........ 15/210.1 |
| 5,301,471 A | * | 4/1994 | Fisher et al. ................. 451/357 |
| 5,378,153 A | | 1/1995 | Giuliani et al. |
| 5,613,259 A | | 3/1997 | Craft et al. |
| 5,768,738 A | | 6/1998 | Lee ............................ 15/210.1 |
| 6,170,107 B1 | * | 1/2001 | George et al. .................. 15/24 |
| 6,209,162 B1 | | 4/2001 | Clairadin et al. ............ 15/97.1 |
| 6,491,692 B1 | * | 12/2002 | Meislin ........................ 606/53 |
| 2002/0131748 A1 | * | 9/2002 | Sato ............................ 385/134 |
| 2002/0166190 A1 | * | 11/2002 | Miyake et al. ............. 15/210.1 |
| 2003/0098045 A1 | * | 5/2003 | Loder et al. .................... 134/8 |

* cited by examiner

*Primary Examiner*—Robert J. Warden, Sr.
*Assistant Examiner*—Laura C Cole
(74) *Attorney, Agent, or Firm*—Conley Rose, PC; Jessica W. Smith; V. Lawrence Sewell

(57) ABSTRACT

An optical connector cleaning device for cleaning a ferrule end surface of an optical or fiberoptic connector is described. The device includes a cleaning rod, a drive mechanism, and a cleaning media, such as a swab, a brush, a pad, or a foam, connected to an end of the cleaning rod and having a thickness past the end of the cleaning rod of at least about 0.125 inches. A mating connector housing the cleaning rod may be provided for connecting with the optical connector. The drive mechanism may be housed in a handheld body or may be mounted on a dummy card connector physically compatible with a slot in a card-cage. The dummy card connector may include an adjustable frame which can be adjusted to modify card size in order for the same dummy card connector to be physically compatible with more than one physical slot configuration.

31 Claims, 2 Drawing Sheets

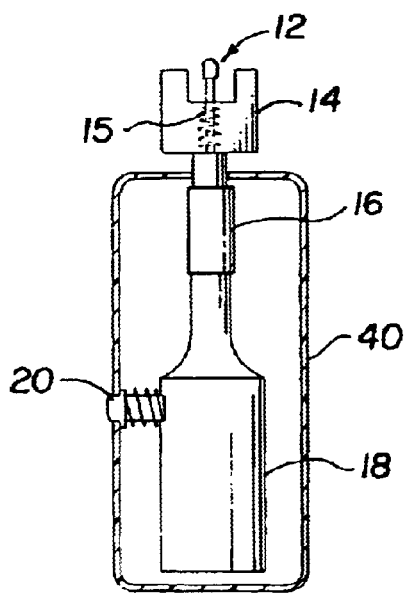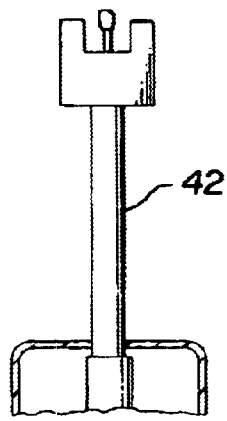
Fig. 2　　Fig. 2A
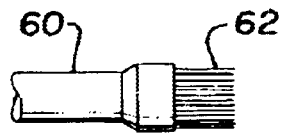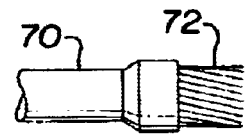
Fig. 3A　　Fig. 3B　　Fig. 3C
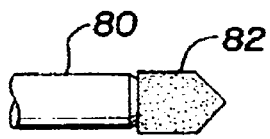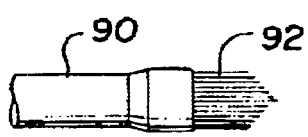
Fig. 3D　　Fig. 3E
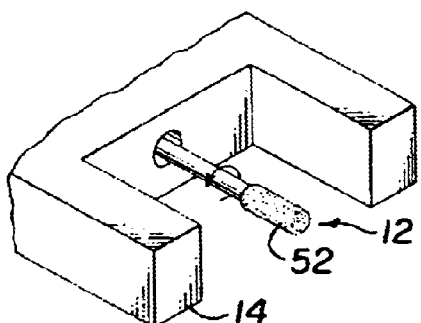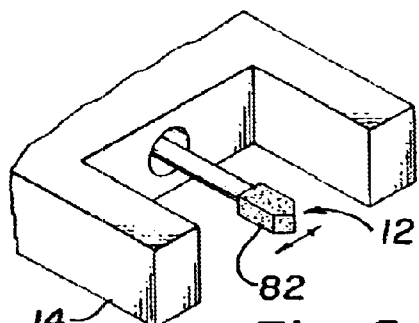
Fig. 4　　Fig. 5

METHOD AND DEVICE FOR CLEANING OPTICAL CONNECTORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to the art of fiber optic connectors and, particularly, to an optical connector cleaning device and a method for using such a cleaning device to clean optical connectors at optical connector junction job sites or in the manufacturing process thereof.

BACKGROUND OF THE INVENTION

Fiber optic connectors of a wide variety of designs have been employed to terminate optical fiber cables and to facilitate connection of the cables to other cables or other optical fiber transmission devices. In general, typical fiber-optic connectors include a ferrule which mounts and positions an optical fiber or fibers within the connector. The ferrule may be fabricated of such material as ceramic or glass filled resin. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

For instance, in the case of a single fiber connector, an optical fiber may be bonded at the center of a cylindrical rod called a cylindrical ferrule; the cylindrical ferrule is inserted into a precisely-formed cylindrical hollow portion of an alignment sleeve of the connector, so that two opposing female end surfaces can be butted and connected to each other for the alignment of two opposite fibers. Further, in the case of a multi-fiber connector, a plurality of fibers may be arranged in predetermined positions and bonded to a resin cubic body called as a cubic ferrule; and then two cubic ferrules may be engaged with each other via two guide pins and two small-diameter guide holes so that two opposing ferrule end surfaces of a plurality of arranged fibers are butted and connected to each other for the alignment of two opposite fibers, respectively.

Such fiber-optic connectors typically are connected end-to-end. In other words, two opposite end surfaces of opposing ferrules are mated to directly connect opposing end surfaces of the optical fibers to each other. The connectors should provide excellent connection characteristics. However, major problems are encountered if the ferrule end surfaces become contaminated by dust, oil or other contaminants which will cause the connection characteristics to become markedly deteriorated.

In order to solve the contamination problems, cleaners have been provided to clean the ferrule end surfaces of fiber-optic connectors. The cleaners typically include some form of soft cloth or paper which is moved over the ferrule end surfaces. The cloth or paper may be dampened with a cleaning solution such as ethanol. Fluorocarbon gas may also be used to remove excessive ethanol and any cloth or paper dust While cleaners of the character described above have proven effective for their intended purposes, they have limitations in that the fiber-optic connectors typically are "brought to" the cleaner or there is easy access of the cleaner to the connectors. In other words, the connectors are easily moved to positions in engagement with the cleaner. Such cleaners are extremely difficult to use and, often, are not effective where there is limited access to the connectors, such as where the connectors are located in a remote or confined area. Still further, it is difficult, if not impossible, to use most existing cleaners on the ferrule end surfaces of connectors which are mounted in adapter assemblies. The connectors must be removed from the adapters in order to be cleaned. This problem equally exists when a ferrule end surface is located inwardly or recessed within a mating end face of a connector.

Other methods of cleaning ferrule end surfaces have included the use of adhesive heads in an attempt to get contaminants to stick to the heads without leaving adhesive behind as an additional contaminant and the use of various cassettes with advancing mechanisms. In such cassettes, the ferrule end is typically cleaned by contact with a thin strip of fibrous non-adhesive tape or fabric which is exposed from the cassette. The cleaning contact is initiated either by moving the ferrule end across the strip or advancing the strip past the ferrule end. An example of the latter may be seen in U.S. Pat. No. 6,209,162. These use a mechanism similar to those used for cleaning the magnetic heads in audio cassettes and VCR's, which typically incorporate the use a tape made of fibrous material to abrade the surface to be cleaned.

SUMMARY OF THE INVENTION

One embodiment of the present invention addresses an optical connector cleaning device for cleaning a ferrule end surface of an optical connector. The device includes a cleaning rod and a drive mechanism operatively coupled to the cleaning rod to impart mechanical motion to the cleaning rod. A cleaning media is connected to an end of the cleaning rod and has a thickness past the end of the cleaning rod of at least about 0.125 inches. The cleaning media preferably has a thickness past the end of the cleaning rod of between about 0.125 inches and 0.5 inches, more preferably between about 0.3 inches and 0.4 inches past the end of the cleaning rod. Various alternative embodiments for the cleaning media include a swab, a brush, a pad, and a foam.

In other embodiments, the device may include a mating connector housing the cleaning rod without being operatively coupled to the drive mechanism and/or a resilient member coupled to the cleaning rod and biasing the cleaning rod in a direction along the main axis of the cleaning rod and towards the end of the cleaning rod having the cleaning media. In embodiments with a resilient member, the member may include a mechanical spring or a hydraulic spring or other springs familiar to those of skill in the art.

A preferred embodiment provides an optical connector cleaner device for cleaning a ferrule end surface of an optical connector. This embodiment includes a cleaning rod, a cleaning media connected to an end of the cleaning rod, and a drive mechanism operatively coupled to the cleaning rod to impart rotary motion to the cleaning rod. While the drive mechanism is preferably an electric drive mechanism, a pneumatic drive mechanism or other drive mechanisms may also be employed. The mechanical motion imparted to the cleaning rod and the attached cleaning media may include rotary motion and/or oscillating linear motion, either individually or in combination, or may include a more complex mechanical motion.

One preferred embodiment houses the drive mechanism, and potentially other portions of the device as well, in a handheld body. An alternative embodiment mounts the drive mechanism on a dummy card connector, wherein the dummy card connector is physically compatible with a slot in a card-cage. In a preferred version of this embodiment, the dummy card connector includes an adjustable frame which may be adjusted to modify card size in at least one direction in order for the same dummy card connector to be physically compatible with more than one physical slot configuration and/or more than one card cage.

BRIEF DESCRIPTION OF THE DRAWINGS

FIG. 2 is a schematic drawing of a hand-held version of the optical connector cleaner.

FIG. 2A is a close-up drawing showing an extended or alternative configuration of a hand-held version of the optical connector cleaner.

FIG. 3A is a close-up drawing of one version of the cleaning media.

FIG. 3B is a close-up drawing of an alternative version of the cleaning media.

FIG. 3C is a close-up drawing of an alternative version of the cleaning media.

FIG. 3D is a close-up drawing of an alternative version of the cleaning media.

FIG. 3E is a close-up drawing of an alternative version of the cleaning media.

FIG. 4 is a close-up drawing of a cleaner media and mating connector illustrating one method of operation.

FIG. 5 is a close-up drawing of a cleaner media and mating connector illustrating an alternative method of operation.

DETAILED DESCRIPTION OF THE INVENTION

Figure 1:
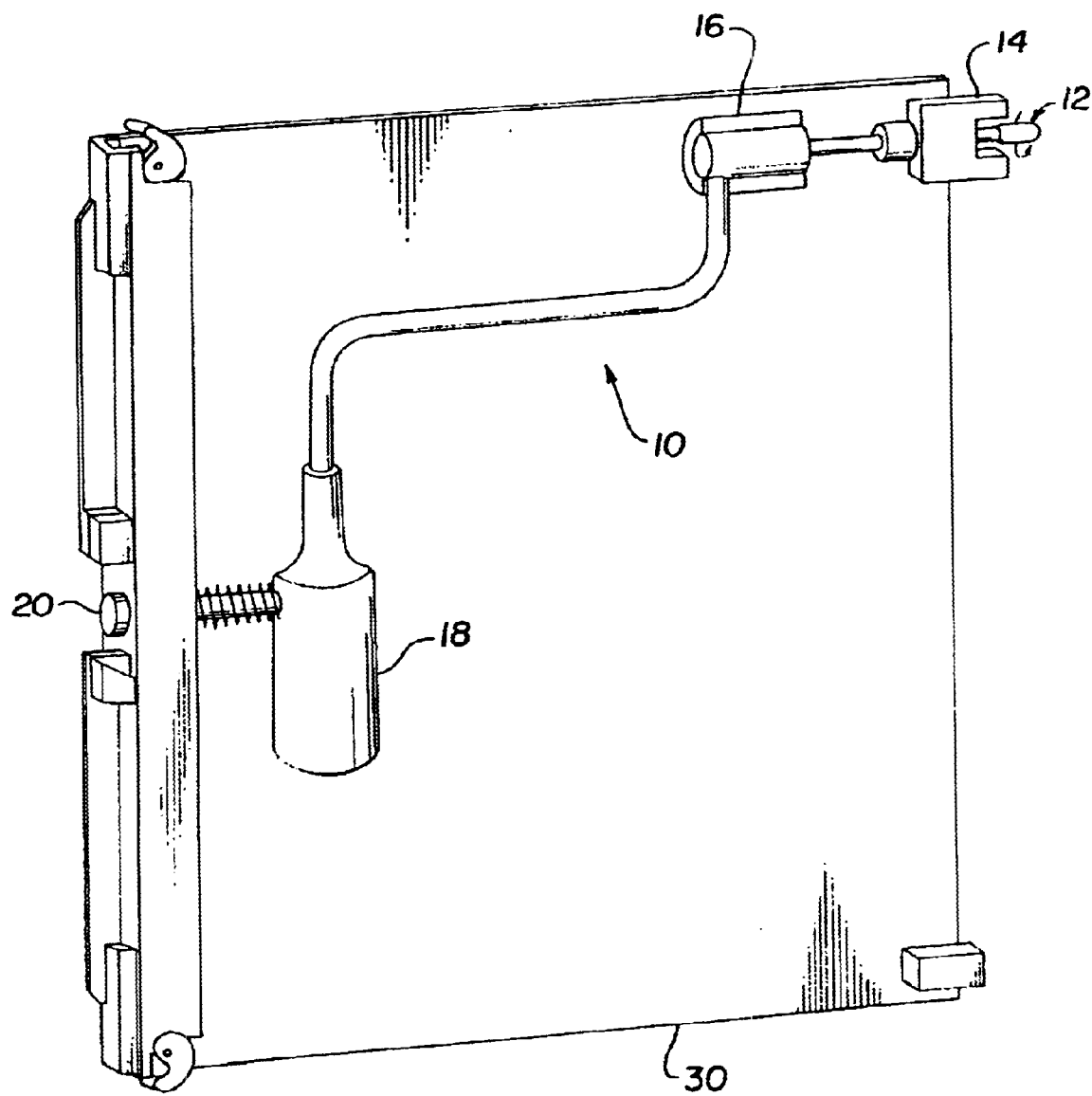
FIG. 1 is a schematic drawing of a card connector version of the optical connector cleaner.

The present invention may be used to easily and effectively clean the end of a ferrule of a fiber optic connector. Such ferrules may be mounted on a backplane in a telecom rack and one version of the present invention is specifically configured to simplify access and alignment to clean such ferrules without need to remove them from their mounting. Such ferrules may also be mounted in other positions or may be withdrawn and held free of mounting. The present invention is equally capable of cleaning ferrules of fiber-optic connectors in these states as well.

FIG. 1 illustrates an embodiment of the present invention specifically configured to simplify cleaning the surface of a ferrule in a fiber optic connector mounted in a backplane of a card-cage. The optical connector cleaner device 10 is mounted on a dummy card 30 which has the physical connecting characteristics of the cards typically mounted in the card-cage or telecom rack for functional purposes, but does not carry any of the operative circuitry or other systems to interact with the backplane. The cleaner device 10 illustrated in FIG. 1 includes a cleaning member 12 within a mating connector 14. The cleaning member 12 is coupled to a drive converter 16 which provides mechanical movement to the cleaning member 12. The drive converter 16 is powered by a power source 18, which could represent a battery, a pneumatic source, or other power source as recognized by those of skill in the art. The drive converter 16 and power source 18 together make up a drive mechanism which may be pneumatic, electric, electromagnetic, or any other means of taking a relatively compact stored energy source and converting it to mechanical motion as recognized by those of skill in the art. The power source 18, and hence the drive mechanism may, in the present embodiment, be initiated by use of a switch 20. While the preferred embodiment of the present invention employs a simple mechanical motion (rotary motion or oscillating linear motion) as its cleaning motion, more complex drive mechanisms with more complex motion such as those disclosed in U.S. Pat. Nos. 5,378,153 and/or 5,613,259 (both of which are incorporated herein by reference) could also be employed in combination with other aspects of the present invention.

In the embodiment illustrated in FIG. 1, to use the cleaning card, it is inserted into the card-cage to engage the dummy card into the slot within the card-cage and the mating connector 14 mates with the fiber optic connector on the backplane bringing the cleaning member 12 into contact with the end surface of the fiber-optic connector ferrules. While a specific mating connector 14 is not illustrated here, those of skill in the art will recognize that various standard and typical connectors are present in the current marketplace which may be used to provide physical alignment for end-to-end connection of fiber-optic lines within ferrules held within such connectors. In embodiments of the present invention using a mating connector 14, the appropriate mating connector should be selected in order to correspond to the connector housing the fiber-optic lines to be cleaned. In an alternative embodiment, an adjustable mating connector 14 could also be employed which is able to adjust its mating configuration to mate with more than one standard connector configuration. The illustrated embodiment shows the mating connector 14 at a specific position with respect to the dummy card, but this position may vary based on the alignment of fiber-optic connectors on the backplane. The position may be permanently set for a given dummy card 30, or the card 30 may be configured to allow the cleaner device 10 and its mating connector 14 to be reoriented to clean connectors at different relative positions on the backplane. Some backplanes may have multiple connectors per slot and the dummy card 30 may be configured to hold multiple devices 10 to clean the multiple connector ends simultaneously.

In an alternative embodiment, the dummy card 30 may comprise an adjustable frame with brackets or mounting members to mount and hold the cleaner device 10 and its related elements. Such a frame could then be adjusted in depth and/or in height to enable it to mate with different size card cages (and/or different size slots within such card cages) without need for additional specifically sized dummy cards. Like the standard dummy card 30, an adjustable frame dummy card could also be designed to permit reorientation of the cleaner device 10 and its mating connector 14 to clean connectors at different relative positions on the backplane. In one embodiment, an adjustable frame dummy card could also be configured to hold multiple devices 10 for those occasions when multiple connector ends are on the same backplane aligned with the same card clot in a card cage.

FIG. 2 illustrates the preferred embodiment of the optical connector cleaner device of the present invention where the cleaner device 10 is cased within a handheld body 40 for use by hand in any number of settings. The illustrated embodiment of the device 10 still incorporates the same elements of cleaning member 12, mating connector 14, drive converter 16, power source 18, and switch 20. The body is illustrated in a rudimentary cylindrical shape, but may take on different configurations to accommodate easier gripping or manipulation or to better fit into extended cavities while still providing the ability to appropriately orient the cleaning media against the ferrules to be cleaned. As illustrated in the close-up view of FIG. 2A to reach more distant ferrules, such as those installed in the backplane of a card-cage, an alternative embodiment features an extension 42 between the drive converter 16 and the cleaning member 12 and mating connector 14. This extension could be a permanent additional length to allow greater reach, or could be an extendable section which may be expanded or contracted to allow for more compact storage or a compact state for entry into a restricted area, followed by extension for engagement with the ferrule to be cleaned.

In the embodiment illustrated in FIG. 2, the device is held by hand. The user guides the device into the proper position activates the drive mechanism imparting mechanical motion to the cleaning member which results in the cleaning member and specifically the cleaning media shearing across the surface of the ferrule and connector end. The proper position is one in which the cleaning member engages the surface of the ferrule and the cleaning media at the end of the cleaning member is at least slightly deformed against the surface of the ferrule. The ability of the cleaning media to deform to some degree is preferable and provides potential benefits in fit to the surface features, compensation for minor misalignment, and potentially may improve cleaning effect.

The use of a mating connector 14 is preferable for assisting in locating the proper position when the ferrule to be cleaned is itself mounted within a housing forming a corresponding mating connector. However, if the ferrule is not within a mating connector itself or even where the ferrule is within a mating connector, a mating connector 14 is not necessary for proper operation of the present invention.

An alternative embodiment of the present invention would provide pressure control to attempt to simplify having the cleaning member contacting the ferrule end surface with a pressure within a particular range. This pressure control could be provided by a resilient member 15, shown in FIG. 2, such as a mechanical spring or a hydraulic spring supporting the cleaning rod. In this manner, as the hand held device is put into position, the user would push the cleaning member into engagement with the ferrule end surface until the member started to retract against the spring force. The user would not push the member hard enough for it to reach the spring stop. There would thus be a range of movement where the force on the ferrule surface from the cleaning member would be sufficient to initially deform the spring but not so much as to push past the spring's capacity. This could help insure that sufficient force was supplied, but not too much force was supplied, potentially improving control. While this would be particularly useful for the hand held device without a mating connector, it could also provide advantages in combination with a mating connector or even on the dummy card version of the device. The preferred ranges of force could be determined experimentally for different cleaning environments and different cleaning media. Some consideration could be given to spring loading done on the connectors themselves currently in the art as a guideline for spring construction and loads for cleaning members. Those of skill in the art could design the springs to meet the appropriate parameters for initial deflection and peak force.

Various potential cleaning members are illustrated in the collection of close-up FIG. 3. While various potential media include swabs, brushes, fibers, foams, and pads, it is preferable that there be some depth to the cleaning media and some degree of deformability of the media to allow the media to conform to the surface features and surface orientation of the ferrules to be cleaned. While preferences may differ a small amount between different media and media structures, in general the depth of the cleaning media is preferably at least about 0.125 inches past the end of the cleaning rod, more preferably between about 0.125 inches and about 0.5 inches past the end of the cleaning rod, and most preferably between about 0.3 inches and about 0.4 inches past the end of the cleaning rod. Those of skill in the art may recognize additional configurations which provide these features which are likewise understood to be part of the scope of the present disclosure.

FIG. 3A illustrates the currently preferred embodiment with a cleaning rod 50 and cleaning media 52 in the form of a swab, such as might be found on a cotton swab or on the more traditional swabs used for hand-cleaning of fiber-optic connectors. The preferred depth of the swab is at least 0.125 inches thick past the end of the cleaning rod 50 and more preferably within a range of 0.3 inches and 0.4 inches thick. The cleaning rod is preferably a relatively stiff member, while the cleaning media is preferably at least somewhat deformable, hence the length or depth of the cleaning media past the end of the cleaning rod in this and other embodiments provides a range of deformability of the cleaning media before the stiff cleaning rod stops or significantly restricts additional deformation. The swab of FIG. 3A is axially symmetrical making it particularly preferably for rotational cleaning.

FIG. 3B illustrates a cleaning rod 60 and cleaning media 62 in the form of a brush, with bristles illustrated perpendicular to the end of the cleaning rod 60. The bristles are preferably at least 0.125 inches long past the end of the cleaning rod 60, and more preferably within a range of 0.2 inches and 0.5 inches long.

FIG. 3C reflects an alternative bristle alignment where cleaning rod 70 has cleaning media 72 in the form of angled bristles. The angled bristles may provide more favorable abrading or shearing action on the ferrule surface. When used with a rotational cleaning approach, one embodiment would have the bristles angled about the central axis such that the direction of angle is always perpendicular to the rotational moment. The cleaning rod 70 and cleaning media 72 could either be rotated into the grain of bristles or against the grain of bristles as is more appropriate for best cleaning of the particular contaminants being removed. In this embodiment, the depth from the end of the bristle to the surface of the cleaning rod 70 is preferably at least 0.125 inches and more preferably within a range of 0.2 inches and 0.5 inches.

FIG. 3D illustrates an alternative embodiment which may be particularly suited to side to side cleaning in which the cleaning rod 80 supports a cleaning media 82 which has towards its tip an angular slope to a line intersecting the central axis. Those of skill in the art will recognize the similarities between this shape and some foam "brushes" used for painting. The orientation would preferably be such that the line of intersection is perpendicular to the sweep direction. The media preferably extends at least 0.25 inches past the end of the cleaning rod 80 at the media's shortest length and more preferably is within a range of 0.3 inches and 0.5 inches past the end of the cleaning rod 80 at the media's shortest length.

FIG. 3E illustrates an alternative embodiment similar in configuration to FIG. 3D, only replacing the foam or swab media with a cleaning media 92 made of fibers of varying lengths resulting in angles to a line intersecting the central axis. The shortest fibers preferably extend past the end of cleaning rod 90 at least 0.25 inches and more preferably a range of 0.3 inches and 0.4 inches between the shortest fibers and the end of the cleaning rod 90.

For the process of cleaning itself, the preferred method as illustrated in the close-up view of FIG. 4 involves the drive mechanism using the drive converter 16 as a torque converter and spinning the cleaning member 12. When turning on the drive mechanism, the cleaning member 12 will spin about its axis and clean the end of the ferrule on a fiber connector. The cleaning member 12 is typically made up of a cleaning rod with a cleaning media such as a swab or brush on one end. The present illustration incorporates the use of cleaning media 52 as illustrated in FIG. 3A, but other media as described in this specification and as understood by those of skill in the art could also be employed. The rotation may be clockwise or counterclockwise. In an alternative embodiment, the rotation may alternate back and forth between clockwise and counterclockwise in an effort to change the angle of attack and better remove certain resistant contaminants. An additional alternative method could replace the spinning or rotational cleaning with alternative mechanical approaches such as an oscillating side-to-side motion or corner-to-corner sweep or other mechanical motion as understood by those of skill in the art A linear side-to-side sweeping motion as illustrated in the close-up view of FIG. 5 may actually be preferable for cleaning multi-fiber connectors with a row of fibers contained within the same cubic ferrule. The present illustration incorporates the use of cleaning media 82 as illustrated in FIG. 3D, but other media as described in this specification and as understood by those of skill in the art could also be employed.

Although not preferred, the cleaning media may also be dipped with cleaning solvent for difficult cleanings. Such a cleaning solvent could include ethanol, for example, but a preferred solution would be quickly evaporative, leaving little or no residue, otherwise the cleaning solution may leave as much contaminant as it removes. One possible cleaning solution which could be incorporated would be the VF-45 solution from 3M (an HFE solution) which evaporates rapidly leaving little or no residue. Nevertheless, in the preferred embodiment of the present invention no solution is used in cooperation with the cleaning media at all. The thicker cleaning media of the present invention may also provide advantages in better absorbing either cleaning solution or contaminants (either with or without cleaning solution) and pulling the same away from the ferrule surface.

The cleaning member is preferably inexpensive, disposable, and easily replaced. The cleaning member is preferably installed so that it is co-centered with and supported by the mating connector, and coupled to the drive mechanism. The cleaning member may be directly connected to the drive mechanism or may be indirectly connected or operatively coupled to the drive mechanism. The term coupled is used to cover both direct connections and indirect connections.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What we claim as our invention is:

1. An optical connector cleaning device for cleaning a ferrule end surface of an optical connector comprising:

a cleaning rod;

a cleaning media connected to an end of the cleaning rod, where the cleaning media has a length extending from the end of the cleaning rod of at least about 0.125 inches;

a drive mechanism operatively coupled to the cleaning rod to impart mechanical motion to the cleaning rod; and a dummy card connector on which the drive mechanism is mounted and the cleaning rod is coupled, wherein the dummy card connector is physically compatible with a slot in a card-cage.

2. The device of claim 1, further comprising:

a mating connector housing the cleaning rod without being operatively coupled to the drive mechanism.

3. The device of claim 1, further comprising:

a resilient member coupled to the cleaning rod and biasing the cleaning rod in a direction along a main axis of the cleaning rod and towards the end of the cleaning rod having the cleaning media.

4. The device of claim 3, wherein the resilient member comprises a mechanical spring.

5. The device of claim 3, wherein the resilient member comprises a hydraulic spring.

6. The device of claim 1, wherein the cleaning media has a thickness past the end of the cleaning rod of between about 0.125 inches and about 0.5 inches.

7. The device of claim 6, wherein the cleaning media is a swab.

8. The device of claim 6, wherein the cleaning media is a brush.

9. The device of claim 6, wherein the cleaning media is a pad.

10. The device of claim 6, wherein the cleaning media is a foam.

11. The device of claim 1, wherein the cleaning media is a swab.

12. The device of claim 1, wherein the cleaning media is a brush.

13. The device of claim 1, wherein the cleaning media is a pad.

14. The device of claim 1, wherein the cleaning media is a foam.

15. The device of claim 1, wherein the drive mechanism is an electric drive mechanism.

16. The device of claim 1, wherein the drive mechanism is a pneumatic drive mechanism.

17. The device of claim 1 wherein the dummy card connector comprises an adjustable frame which may be adjusted to modify card size in at least one direction in order for the same dummy card connector to be physically compatible with more than one physical slot configuration.

18. The device of claim 1, wherein the mechanical motion the drive mechanism is operatively coupled to the cleaning rod to impart comprises rotary motion.

19. The device of claim 1, wherein the mechanical motion the drive mechanism is operatively coupled to the cleaning rod to impart comprises oscillating linear motion.

20. An optical connector cleaner device for cleaning a ferrule end surface of an optical connector comprising:

a cleaning rod;

a cleaning media connected to an end of the cleaning rod;

a drive mechanism operatively coupled to the cleaning rod to impart rotary motion to the cleaning rod; and a dummy card connector on which the drive mechanism is mounted and the cleaning rod is coupled, wherein the dummy card connector is physically compatible with a slot in a card-cage.

21. The device of claim 20, further comprising:

a mating connector housing the cleaning rod without being operatively coupled to the drive mechanism.

22. The device of claim 20, further comprising:

a resilient member coupled to the cleaning rod and biasing the cleaning rod in a direction along a main axis of the cleaning rod and towards the end of the cleaning rod having the cleaning media.

23. The device of claim 22, wherein the resilient member comprises a mechanical spring.

24. The device of claim 22, wherein the resilient member comprises a hydraulic spring.

25. The device of claim 20, wherein the cleaning media is a swab.

26. The device of claim 20, wherein the cleaning media is a brush.

27. The device of claim 20, wherein the cleaning media is a pad.

28. The device of claim 20 wherein the cleaning media is a foam.

29. The device of claim 20, wherein the drive mechanism is an electric drive mechanism.

30. The device of claim 20, wherein the drive mechanism is a pneumatic drive mechanism.

31. The device of claim 20 wherein the dummy card connector comprises an adjustable frame which may be adjusted to modify card size in at least one direction in order for the same dummy card connector to be physically compatible with more than one physical slot configuration.

* * * * *